United States Patent [19]

Miksic et al.

[11] Patent Number: 5,326,529
[45] Date of Patent: Jul. 5, 1994

[54] METHOD OF INHIBITING CORROSION OF CONCRETE REINFORCEMENTS

[75] Inventors: Boris A. Miksic, North Oaks; Lawrence Gelner, St. Paul, both of Minn.

[73] Assignee: Cortec Corporation, St. Paul, Minn.

[21] Appl. No.: 67,511

[22] Filed: May 24, 1993

[51] Int. Cl.⁵ ............................................. C23F 11/00
[52] U.S. Cl. ............................................. 422/7; 422/9
[58] Field of Search ....................... 422/7, 9; 252/387

[56] References Cited
FOREIGN PATENT DOCUMENTS
247773 12/1987 European Pat. Off. .

Primary Examiner—Timothy M. McMahon
Attorney, Agent, or Firm—Haugen and Nikolai

[57] ABSTRACT

A method of inhibiting corrosion of metal reinforcement structures embedded within cured concrete. The method comprises providing a plurality of exteriorly-accessible generally uniformly distributed openings in the concrete. Thereafter, a plurality of containers is provided, with each container having therein a migrating corrosion inhibitor and having a wall structure which is permeable to the migrating corrosion inhibitor. One container is placed in each of a sufficient number of openings in the concrete such that a sufficient quantity of migrating corrosion inhibitor exits from the respective containers and migrates through the concrete to the embedded metal reinforcement structures to thereby inhibit corrosion.

7 Claims, 1 Drawing Sheet

METHOD OF INHIBITING CORROSION OF CONCRETE REINFORCEMENTS

BACKGROUND OF THE INVENTION

This invention relates generally to corrosion inhibition of metal reinforcement structures such as reinforcing rods in concrete, and in particular to methodology wherein a plurality of permeable containers containing a migrating corrosion inhibitor are situated in a respective plurality of openings in the concrete.

Concrete structures such as highways, bridges, parking structures, housing, commercial buildings and the like typically have metal reinforcing means embedded therewithin to provide stability and additional strength to the concrete. This reinforcing means can be in the form of reinforcing rods, mesh, metallic fibers and the like, and is usually situated in regular intervals within the concrete by pouring wet concrete therearound or, in the case of metallic fibers, adding during the concrete mixing operation, for subsequent curing. Over time, unfortunately, this metal has a tendency to corrode as external elements such as moisture, atmospheric pollutants such as sulfur oxides, nitrogen oxides and hydrogen sulfide, road treatment chemicals and the like permeate through the concrete structure and reach the metal. If left untreated, the metal reinforcement structures within this concrete may eventually corrode and thereby lose their structural integrity, resulting in untoward degradation of the concrete.

The combining of migrating corrosion inhibitors with wet concrete has been taught as a means for inhibiting corrosion of metal reinforcement structures within concrete. While such inclusion of corrosion inhibitors with wet concrete is initially effective, eventually the corrosion inhibitors become expended in the subsequently-cured concrete and corrosion inhibition disappears. Further, of course, metal reinforcement structures within concrete which had no formative inclusion of corrosion inhibitors during its blending can begin to corrode almost immediately. Thus, it is apparent that a need is present for on-going corrosion protection for such metal substrates embedded within cured concrete.

It is therefore a primary object of the present invention to provide methodology whereby corrosion inhibitor material can be made available over the long term to metal reinforcement structures embedded within the concrete.

Another object of the present invention is to provide methodology whereby fresh corrosion inhibitor material can be introduced on a regular schedule into cured concrete having metal reinforcement structures embedded therewithin.

Yet another object of the present invention is to provide methodology whereby corrosion inhibitor material is made available in a readily-usable form to thereby permit convenient removal of spent corrosion inhibitor compositions and replacement with fresh compositions.

These and other objects of the present invention will become apparent throughout the description which now follows.

SUMMARY OF THE INVENTION

The present invention is a method of inhibiting corrosion of metal reinforcement structures embedded within cured concrete. The method comprises, first, providing a plurality of exteriorly-accessible generally uniformly distributed openings in the concrete. Second, the invention comprises providing a plurality of containers, with each container containing a corrosion inhibitor composition comprising by weight from about 1% to about 90% migrating corrosion inhibitor and from about 10% to about 99% adsorbent material such as, for example, fumed silica, upon which the corrosion inhibitor is adsorbable. The respective walls of the containers are constructed to be permeable to the corrosion inhibitor such as, for example, being semi-permeable membranes themselves or being inert plastic having a plurality of generally uniformly-distributed holes therethrough. The corrosion inhibitor exits from the container by vapor pressure to thereafter migrate through the porous structure of the concrete or through micro-cracks therein to the metal reinforcement structures within the concrete labyrinth. One container is placed into each of a sufficient number of the exteriorly-accessible openings in the concrete to thereby provide a sufficient quantity of migrating corrosion inhibitor to accomplish corrosion inhibitor. Preferably, the corrosion inhibitor composition comprises by weight from about 75% to about 80% migrating corrosion inhibitor, and from about 20% to about 25% adsorbent material. After placement of a container in an opening, the opening itself can be capped as with a plastic insert for subsequent removal and replacement of the container.

DETAILED DESCRIPTION OF A PREFERRED EMBODIMENT

Figure 1:
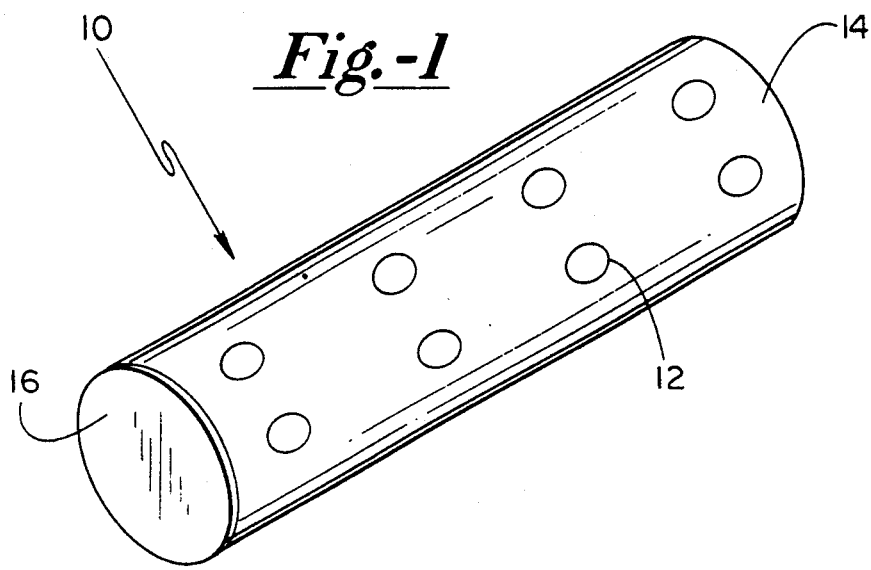
FIG. 1 is a perspective view of a cylindrical container containing a corrosion inhibitor composition.

FIG. 1 illustrates a container which is a cylinder 10 constructed of polypropylene and having a plurality of generally uniformly-distributed holes 12 through its wall. The cylinder 10 can be constructed by any material such as metal, polyethylene or other insert material as known in the art which is resistant to degradation by a migrating corrosion inhibitor. The cylinder 10 has an outside diameter of about 5/8 inch (1.5 cm) and a length of about 2 inches (5.1 cm). The holes 12 have a diameter of about ⅛ inch (0.3 cm), and are positioned about every ½ inch (1.25 cm) on each quarter of the circumference of the cylinder 10. The location and distribution of the holes 12 is not critical, but must be of adequate number and placement to permit escape of migrating corrosion inhibitor. The cylinder 10 is here formed from a tube 14, and has a respective end plug 16 at each end thereof which is disposed within the tube 14 by friction fit. Within the cylinder 10 is a composition comprising by weight about 80% MCI 2000, a migrating corrosion inhibitor available from Cortec Corporation, St. Paul, Minn., and about 20% fumed silica upon which the corrosion inhibitor is adsorbed. The amount of MCI 2000 in each cylinder is about five grams. This composition provides a slightly damp material which is relatively easy to handle and introduce into the cylinder 10. While fumed silica is a preferred adsorbent material, other adsorbent materials such as, for example, vermiculite, Spaghnum moss, cellulose, inorganic or organic thickeners and the like can be employed. Because the migrating corrosion inhibitor here employed is a liquid, the composition defined above is a damp powder which is easy to handle. As the concentration of migrating corrosion inhibitor in the composition is reduced by the maker, the dryer the composition becomes. Conversely, as the concentration is increased, the more the composition resembles a gel or a liquid.

Figure 2:
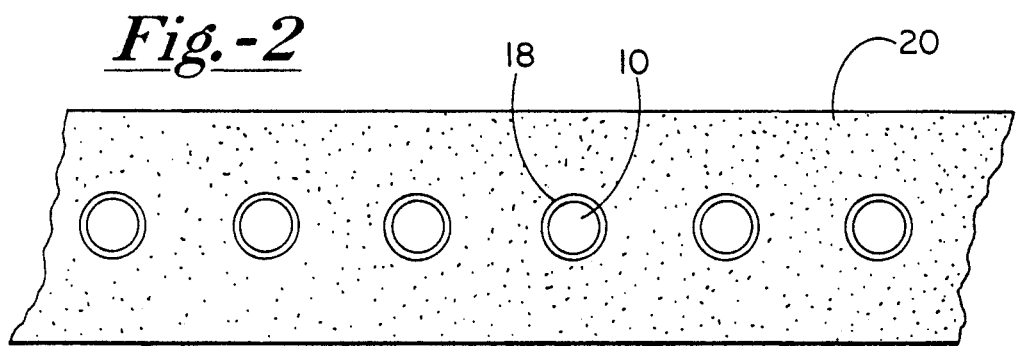
FIG. 2 is an elevation view of cylindrical containers of FIG. 1 in place within a portion of a concrete slab.

Referring to FIG. 2, a plurality of cylinders 10 are shown within respective bored openings 18 of a concrete slab 20. Each opening 18 is preferably only slightly larger than the diameter of the cylinder 10 so that a near friction fit occurs. Openings 18 are preferably placed every 24–72 inches (60–180 cm) along the slab 20 which can have a thickness of 2–24 inches (5–60 cm). In general, the cylinders 10 should be placed in a concentration so that about six cylinders 10 are present for about every square yard surface of a six inch thickness of concrete through which the corrosion inhibitor must migrate. The cylinders 10 have a usual effectiveness of from about one to five years, after which they are removed and replacement cylinders are provided.

Figure 3:
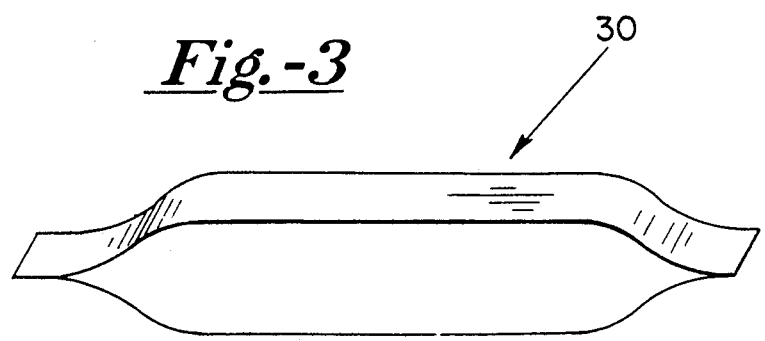
FIG. 3 is a perspective view of a second embodiment of a container constructed of a permeable membrane.

FIG. 3 illustrates a second preferred embodiment of a container 30 constructed of a flexible permeable membrane such as, for example, Tyvek ®, manufactured by Du Pont Company, Wilmington, Del., which is inert to the corrosion inhibitor. The dimensions of the container 30 are substantially the same as those for the cylinder 10 shown in FIG. 1, with the membrane itself sealed at each end. As with the cylinder 10 in FIGS. 1 and 2, the container 30 contains the same composition and is positioned in holes bored in concrete in the same manner and distribution as described for the cylinder 10 in FIGS. 1 and 2.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

We claim:

1. A method of inhibiting corrosion of metal reinforcement structures within cured concrete, the method comprising:
   (a) providing a plurality of exteriorly-accessible generally uniformly distributed openings in the concrete;
   (b) providing a plurality of containers each having a cavity containing therein a corrosion inhibitor composition comprising by weight from about 1% to about 90% migrating corrosion inhibitor and from about 10% to about 99% adsorbent material upon which the corrosion inhibitor is adsorbable, with said containers having respective walls defining said cavity which are permeable to the migrating corrosion inhibitor; and
   (c) placing on container into each of a sufficient number of the exteriorly-accessible openings whereby a sufficient quantity of migrating corrosion inhibitor exits from the containers cavity to thereby migrate to and inhibit corrosion of the metal reinforcement structures embedded within the concrete.

2. The method as claimed in claim 1 wherein the corrosion inhibitor composition comprises by weight from about 75% to about 80% migrating corrosion inhibitor and from about 20% to about 25% adsorbent material.

3. The method as claimed in claim 1 wherein each opening in the concrete and each container are complimentarily shaped.

4. The method as claimed in claim 3 wherein each opening is cylindrical in shape and each container is a cylinder.

5. The method as claimed in claim 4 wherein the wall of the cylinder is constructed of an inert material having therethrough a plurality of generally uniformly distributed holes.

6. The method as claimed in claim 1 wherein the container is a cylinder constructed of an inert material wherein the wall thereof has therethrough a plurality of generally uniformly distributed holes.

7. The method as claimed in claim 1 wherein the container is constructed of a permeable membrane.

* * * * *

UNITED STATES PATENT AND TRADEMARK OFFICE
CERTIFICATE OF CORRECTION

PATENT NO. : 5,326,529
DATED      : Jul. 5, 1994
INVENTOR(S) : Boris A. Miksic and Lawrence Gelner It is certified that error appears in the above-indentified patent and that said Letters Patent is hereby corrected as shown below:

Column 4, line 16, "on" should read -- one --.

Signed and Sealed this

Sixth Day of September, 1994

Attest:

BRUCE LEHMAN

Attesting Officer    Commissioner of Patents and Trademarks